United States Patent [19]

Mullis

[11] Patent Number: 5,028,792

[45] Date of Patent: Jul. 2, 1991

[54] SYSTEM FOR THE VISUALIZATION OF EXPOSURE TO ULTRAVIOLET RADIATION

[75] Inventor: Kary B. Mullis, La Jolla, Calif.

[73] Assignee: Xytronyx, Inc., San Diego, Calif.

[21] Appl. No.: 344,274

[22] Filed: Apr. 27, 1989

Related U.S. Application Data

[63] Continuation-in-part of Ser. No. 156,601, Mar. 1, 1988, abandoned, which is a continuation-in-part of Ser. No. 27,640, Mar. 19, 1987, abandoned.

[51] Int. Cl.[5] .......................... G01J 1/50; G03C 1/73

[52] U.S. Cl. ................................ 250/474.1; 430/338; 430/340; 430/346; 250/482.1

[58] Field of Search ............... 430/332, 338, 339, 340, 430/346, 292, 919; 250/474.1, 482.1; 356/51, 213

[56] References Cited

U.S. PATENT DOCUMENTS

| | | | |
|---|---|---|---|
| 3,112,200 | 11/1963 | Wainer | 430/332 |
| 3,121,632 | 2/1964 | Sprague et al. | 96/48 |
| 3,290,499 | 12/1966 | Vale et al. | 250/474.1 |
| 3,691,380 | 9/1972 | Hubner et al. | 250/474.1 |
| 3,899,677 | 8/1975 | Hori et al. | 250/474.1 |
| 4,297,519 | 10/1981 | Ertel | 526/424 |
| 4,308,459 | 12/1981 | Williams | 250/474.1 |
| 4,737,463 | 4/1988 | Bhattacharjee et al. | 436/2 |

OTHER PUBLICATIONS

Cowell, G. W., Journal of the American Chemical Society, 90:5, pp. 1106-1110 (1968).

*Primary Examiner*—Charles L. Bowers, Jr.
*Assistant Examiner*—Mark R. Buscher
*Attorney, Agent, or Firm*—Dressler, Goldsmith, Shore, Sutker & Milnamow, Ltd.

[57] ABSTRACT

Photochemical systems for the direct visualization of exposure to ultraviolet radiation that effect visible color changes involving a process in which a photoacid is formed upon irradiation of a nitro-substituted aromatic aldehyde with ultraviolet light and wherein proton transfer to a dye causes the dye to undergo a visible color change. The system undergoes such color change to an extent directly proportional to the cumulative amount of ultraviolet incident thereupon.

1 Claim, No Drawings

SYSTEM FOR THE VISUALIZATION OF EXPOSURE TO ULTRAVIOLET RADIATION

CROSS-REFERENCE TO RELATED APPLICATIONS

The present invention is a continuation-in-part of U.S. patent application Ser. No. 156,601, filed Mar. 1, 1988, now abandoned; which in turn is a continuation-in-part of U.S. patent application Ser. No. 027,640, filed Mar. 19, 1987, now abandoned.

BACKGROUND OF THE INVENTION

Ultraviolet light is that portion of the electromagnetic spectrum adjacent to the short wavelengths, or violet end, of the visible light range. The ultraviolet spectrum can be divided into two regions: the near ultraviolet (near the visible spectrum), with wavelengths 200 to 380 nm; and the far ultraviolet, with wavelengths 10 to 200 nm. Approximately ten percent of the energy from the sun is in the ultraviolet range.

The near ultraviolet spectrum can also be divided into three subregions: ultraviolet A which has wavelengths that are generally in the range of 320 to 380 nm; ultraviolet B which has wavelengths that are generally in the range of 280 to 320 nm; and ultraviolet C which has wavelengths that are generally in the range of 200 to 280 nm.

The solar ultraviolet intensity at the earth's surface depends upon a variety of factors including: the thickness of the ozone layer in the upper atmosphere, ozone absorbing ultraviolet radiation strongly between 200 and 300 nm; the latitude; the elevation above sea level; the atmospheric turbidity; the time of day; the time of year; and local conditions such as clouds, fog, dust, and smoke.

Human exposure to ultraviolet radiation can produce effects ranging from suntan, to sunburn, to skin cancer. While there are protective devices, including clothing, oil, ointments, and lotions, which either absorb or reflect ultraviolet radiation or reduce its penetration, there are no portable, inexpensive, disposable, readily available, simple, devices for quantitatively detecting the extent of exposure to ultraviolet radiation. Accordingly, it is desirable to have such a device which the consumer can easily use to ascertain the total amount of ultraviolet exposure.

Exposure to ultraviolet radiation can be measured either directly using electronic devices, such, as semiconductors, or indirectly using a spectrophotometer to quantitate the appearance or disappearance of a chemical species reactive to ultraviolet radiation.

The photochemically mediated detection or measurement of exposure to radiation, especially in the visible and ultraviolet range, is known as actinometry. A classical liquid phase actinometer is described in Hatchard et al., *Proc. Royal. Soc.*, A235:518 (1956), based on the photoreduction of ferrioxalate to form free ferrous ion which reacts with 1,10-phenanthroline causing a green to red color change. Frankenburger et al., U.S. Pat. No. 1,845,835, discloses an ultraviolet sensitive solution, containing leucocyanides, carbinols, and sulfurous compounds, which undergoes a direct, one-step, reversible color change upon exposure to ultraviolet light. These systems will not specifically measure ultraviolet radiation as they are also sensitive to longer wavelengths.

Pavlickova et al., *Col. Czechoslovak Chem. Comm.*, 51:36B (1986), describes a liquid phase actinometer, based on the photohydrolysis reaction of 3,4-dimethoxynitrobenzene, for the determination of ultraviolet light intensity. This liquid phase system does not have output in the visible range and is intended for use with a spectrophotometric device. Thus, utility in "field" applications is severely limited.

Reversible reactions have been suggested for use in actinometry. In the solution systems of Burg, U.S. Pat. No. 3,561,969, for example, a light sensitive solution undergoes a direct, one-step, reversible color change with short exposures to white light. Actinometric complications and resultant inaccuracies are introduced by reversibility in such systems.

Solid state actinometers which rely on transformations of compounds showing no absorption in the visible range frequently have the disadvantage of requiring use of a spectrophotometer. Examples of such systems are found in Bunce et al., *J. Photochem.*, 23:219-231 (1983), and Bunce et al., *J. Photochem.*, 34:105-115 (1986), which disclose the use of azoxybenzene in blocks of polymethylmethacrylate. Some solid state systems have the further disadvantage of requiring specially designed vacuum cells. For example, Cowell et al., *J. Am. Chem. Soc.*, 90:1106 (1968), discloses nitrobenzaldehyde in a film of polymethylmethacrylate as part of a system also requiring a spectrophotometer.

Disadvantages associated with some actinometric systems include their variable sensitivity and inability to discriminate among various wavelengths of radiation--some systems being responsive to broad ranges of radiation and others limited to narrow ranges. Several patents (e.g., Smith, U.S. Pat. No. 3,929,488; Harper et al., U.S. Pat. No. 4,296,194; and Shelnut et al., U.S. Pat. No. 4,348,47) disclose a process that is used in lithographic print plate manufacture and is responsive to a mixture of both ultraviolet and visible light. Not only is the process not specific for ultraviolet radiation, it does not have a dynamic range of responsiveness, is extremely reactive to low levels of radiation, and utilizes unstable diazonium compounds which are dangerous if they come in contact with the skin. In contrast, Schmidt et al., J. *Photochem.*, 25:489-499 (1984), describes two systems specific for two distinct regions of ultraviolet light. One system, the photoxidation of meso-diphenyl- helinathrene, is recommended for the 475-610 nm range and a second system, including the photoreversible photocycle reversion of the endoperoxide of heterocoerdianthrone, is suited for re-usable actinometry in the 248-334 nm range. Again, systems such as these that require a photometer are disadvantageous because their "output" cannot be directly visualized. Further, the compounds employed are both expensive and potentially carcinogenic.

Another system responsive to both visible and ultraviolet radiation utilizes photoactivators or photosensitizers which enhance the density of image formation upon exposure of leuco dyes to short periods of ultraviolet light without affecting the leuco dyes' reactivity to visible light. See, e.g., Sprague et al., U.S. Pat. No. 3,121,632. Yet another system responsive to both visible and ultraviolet radiation is disclosed in Wainer, U.S. Pat. No. 3,112,200. Upon a several seconds exposure to light (250-400 nm), the halogen-containing compound of the dry photographic film is converted to a free radical, which leads to the production of significant amounts of acid and water, thereby resulting in a visible color change in the acid-base type indicator dispersed throughout the film. Still another system responsive to both visible and ultraviolet radiation is disclosed in Zweig, U.S. Pat. No. 3,903,423. Zweig discloses two systems; the first uses oxzolidine-diones which darken only in response to radiation shorter than 320 nm; the second system uses photochromic cyclohexadiene compounds, such as xanthenones, which absorb not only from 320 nm and shorter, but also absorb at wavelengths longer than 320 nm, thereby requiring a filter to protect the system from longer wavelength radiation, such as visible light.

Some measurement systems which do not require a photometer to determine the amount of radiation exposure are simultaneously sensitive to both far ultraviolet radiation and to ionizing radiation and insensitive to near ultraviolet radiation and therefore cannot be used for the selective measurement of exposure to near ultraviolet radiation. For example, McLaughlin, *Intl. J. of Applied Radiation and Isotopes,* 17:85–96 (1966), discloses pre-activated colorless cyanides of triphenylmethane dyes, which can be made into films which, upon irradiation with far ultraviolet or ionizing radiation change from a colorless to colored state. See also, McLaughlin et al., U.S. Pat. No. 4,006,023. Similarly, Cerami et al., U.S. Pat. No. 4,466,941 discloses a composition comprising a complex of leucocyanide and serum albumin which, upon exposure to x-rays, gamma rays, and/or other short wave length radiation including, ultraviolet radiation, results in the appearance of color.

Systems for detecting ionizing radiation wherein exposure to ionizing radiation causes a halogen-containing compound to form a halo-acid which in turn causes an acid-sensitive dye to change color are disclosed in numerous patents. See, e.g., Vale et al., U.S. Pat. No. 3,290,499; Huebner et al., U.S. Pat. No. 3,691,380; Matsumoto et al., U.S. Pat. No. 3,743,846; Hori et al., U.S. Pat. No. 3,899,677; and Lemahieu et al., U.S. Pat. No. 4,008,085. In general, these systems are either heat sensitive or visible light sensitive. To the extent that they display ultraviolet light sensitivity, none are noted to be specific for ultraviolet light detection. None of these systems is suitable for use in applications requiring low toxicity.

Reversible photochromic materials useful in the preparation of photochromic plastic films, sheets, and opthalmic lenses and rapidly responsive to exposure to light are disclosed in Uhlmann et al., U.S. Pat. No. 4,012,232 and Wagner et al., U.S. Pat. No. 3,666,352. Generally, these materials change their transmission or reflectance upon being subjected to ultraviolet or visible irradiation and subsequently revert to their original state upon exposure to a different wavelength of radiation, or removal of the initial light source. Photochromic polymers capable of undergoing reversible changes between two chemical species induced by light absorption can be used for reversible optical information storage and have been suggested for actinometric uses in badges to detect unsafe levels of ultraviolet exposure. Wilson, *Phys. Technol.,* 15:233 (1984). However, such a suggestion does not take into account the reversibility of the reaction nor the responsiveness of the reaction to visible light and resultant erroneous readings obtained when attempting to ascertain the extent of ultraviolet exposure.

*Chem. Eng. & News,* 64:77 (September 1986), reports that a system for indication of the passage of time and exposure to elevated temperatures is being developed as a spoilage indicator for perishable products. The indicators consist of filter paper dipped in a solution containing a leuco base dye and orthonitrobenzaldehyde. Commencing with a discrete photoactivation step, an oxidation process causes the indicator to begin to undergo a progressive color change in the acidified environment which is both time and temperature dependent. The rate at which the color change appears can be adjusted in accordance with the shelf-life of any given product so that a color change appears more quickly for some goods having a short shelf-life. Visible light above 400 nm does not activate the system. After initial photoactivation, the dyestuff color change reaction of this system is responsive to the passage of time and increased temperature; however, the system cannot measure the extent of subsequent exposure to ultraviolet radiation.

In sum, numerous actinometric devices and systems have been proposed in the prior art. None has been totally responsive to the need in the art for systems allowing ready visualization of cumulative exposure to ultraviolet light which are easily constituted from relatively inexpensive and non-toxic components and which display specificity for ultraviolet light and relative insensitivity to heat and the passage of time.

BRIEF SUMMARY OF THE INVENTION

The present invention is directed to a film that is substantially oxygen impermeable and changes color in response to exposure to ultraviolet (UV) radiation. The film comprises a mixture of a hydrophilic polymer, a nitro-substituted aromatic aldehyde for producing hydrogen ions in response to UV radiation and at least one dye that is substantially insensitive to changes in temperature and sensitive to changes in hydrogen ion concentration.

The films of the present invention can optionally contain water.

Another embodiment of the present invention is directed to an ultraviolet radiation dosimeter that comprises an ultraviolet radiation transparent moisture barrier adhered to and surrounding the films of the present invention.

The ultraviolet radiation dosimeter of the present invention can optionally contain an ultraviolet-A radiation filter that covers at least a portion of the surface of the film that is to be exposed to ultraviolet radiation.

The ultraviolet radiation dosimeter of the present invention can also optionally contain a color standard chart in close visual proximity to the film. The dosimeter can also contain means to affix the dosimeter to a user such as an adhesive layer of velcro strip or the like.

The color change is proportional to the cumulative amount of exposure to ultraviolet radiation and one or more dyes can be used to provide single or multiple color changes in response to changes in hydrogen ion concentration caused by cumulative exposure to ultraviolet radiation.

DETAILED DESCRIPTION OF THE PRESENT INVENTION

The films of the present invention comprise a mixture of a hydrophilic polymer, a photoacid progenitor compound such as a nitro-substituted aromatic aldehyde for producing an acid in response to UV radiation and at least one dye that is substantially insensitive to changes in temperature and sensitive to changes in hydrogen ion concentration.

The films of the present invention are substantially oxygen impermeable, temperature stable, hydrophilic and have high tensile strength. Thus, films of the present invention provide good barriers against oxygen, do not soften or become brittle upon exposure to high or low temperatures, remain non-tacky at high humidity and are abrasion and tear resistant. The films of the present invention do not change color in response to temperature changes or exposure to the atmosphere (oxygen) but change color in response to cumulative exposure to ultraviolet radiation.

As used herein, the term "substantially oxygen impermeable" is intended to mean that less than about $1\times10^{-12}$ cubic centimeter of oxygen per second is passed through a 1 square centimeter area of film when the pressure across a film thickness of 1 centimeter is 1 centimeter of mercury and the temperature is 25° C.

As used herein the term "hydrophilic" is intended to mean that the film absorbs water at a rate of more than 0.5 percent by weight in a twenty-four hour period.

Hydrophilic polymers are used to prepare the films of the present invention. Representative hydrophilic polymers include polyvinyl alcohol, derivatized cellulose and polyethylene glycol and the like.

The term "nitro-substituted aromatic aldehydes" is intended to include any aromatic aldehyde that contains a nitro substituent. Preferred aldehydes are those wherein the nitro substituent is in an ortho position with respect to the aldehyde group. Representative aldehydes include ortho-nitrobenzaldehyde; 2,4-dinitrobenzaldehyde; 2,6-dinitrobenzaldehyde; and orthonitrocinnamaldehyde. Ortho-nitrobenzaldehyde is the most preferred aldehyde for use in the present invention, particularly the bisulfite adduct thereof.

Surfactants can also be used in the films of the present invention to impart wetability and leveling in manufacture. Representative surfactants which can be utilized are sodium lauryl sulfate, sodium dodecylbenzene sulfonate, nonylphenol derivatives and the like.

The films of the present invention preferably contain water in an amount sufficient to permit the transfer of protons from the photoacid to the dyestuff. Preferred films of the present invention comprise a mixture of:

from about 50 to about 99 weight percent polyvinyl alcohol;

from about 0.5 to about 50 weight percent water;

from about 0.01 to about 5 weight percent of at least one acid-sensitive dye that is substantially insensitive to changes in temperature;

from about 0.05 to about 5 weight percent of a surfactant; and from about 1 to about 40 weight percent nitro-substituted aromatic aldehyde.

The films of the present invention are useful as an exposure indicator in a UV radiation dosimeter. Thus, a UV dosimeter of the present invention comprises a film of the present invention surrounded by a UV radiation transparent moisture barrier. Typically, such a moisture barrier is a film of polyethylene, polymethylacrylate and the like.

Preferably, a UV dosimeter of the present invention further includes a UV-A radiation filter that covers at least a portion of the surface of the UV exposure-indicating film. Particularly preferred are filters operating to preferentially exclude UV radiation of wavelengths greater than about 320 nanometers.

Preferably, a UV dosimeter of the present invention includes a color standard chart affixed to the dosimeter in close visual proximity to the exposure-indicating film. The chart contains discrete areas of color corresponding to the colors displayed by the indicting film in response to preselected amounts of UV radiation.

A wide variety of dyes is suitable for use in systems (films and dosimeters) of the present invention. They may be initially colored or colorless; soluble in organic or aqueous solutions; and subject to one or more color changes over a range of pH values. Dyes sensitive to changes in pH may be used singly, or in combination with each other, or in combination with dyes relatively insensitive to changes in pH, to produce a broad range of color changes ("phototranschromic" effects). Some of the films of the invention comprise a mixture of two or more dyestuffs, each dyestuff having an initial color state (which may be different from or the same as the other dyestuff's initial color state), a final color state (which may be different from or the same as the other dyestuff's final color state) and, in addition having intermediate color state(s) that are not additive mixtures of the initial and final color states of the particular system selected.

A preferred dye system of the present invention is selected to provide a color change upon initial exposure to ultraviolet radiation and further color changes upon low, medium and maximum levels of exposure. Particularly preferred are systems where bromophenol blue and m-cresol purple are present in about equal molar amounts.

Representative dyes that can be utilized in the present invention include aniline blue, methyl violet, crystal violet, ethyl violet, brilliant green, oralochite green oxalate, methyl green, cresol red, quinaldine red, para methyl red, metanil yellow, thymol blue, m-cresol purple, orange IV, phenylazoaniline, erythrosin B, benzopurpurin 4B, bromophenol blue, congo red, methyl orange, ethyl orange, bromocresol green, resazurin, ethyl red, methyl red, alizarin red, bromocresol purple, chlorophenol red.

In certain embodiments of the invention, the film includes a solubilizer for the nitro-substituted aromatic aldehyde (e.g., an adduct forming agent such as sodium meta bisulfite), a pH adjuster (such as sodium hydroxide), an anti-oxidant (such as hexamethylenetetramine) and/or an organic or aqueous buffering agent. Suitable buffering agents, such as Tris-HCl, sodium deoxycholate, and sodium phosphate, can be used to lessen or to increase the responsiveness of the films. The relative proportions of nitro-substituted aromatic aldehyde, dyes, medium, solubilizer, anti-oxidant, pH adjuster, and buffer are subject to wide variations depending upon the particular use contemplated and the particular color changes desired.

The following examples illustrate the production of materials which undergo visible color changes upon exposure to near ultraviolet light. Also illustrated are materials which can be constructed to undergo this color change to an extent directly proportional to the cumulative amount of ultraviolet light incident upon the materials and which can be variously constructed to differ in terms of initial, intermediate, and final color states and in terms of the total amount of ultraviolet exposure required for a visible color change to occur. Also illustrated are exemplary systems allowing for the convenient measurement of the extent of ultraviolet illumination reaching a particular location, object, or person which can be readily used as a means for monitoring personal exposure to ultraviolet light from various sources, including the sun. Various other uses are anticipated.

More specifically, Examples 1-5 illustrate the preparation of plastic films and other thin layers or solid objects which exhibit phototranschromic effects. Examples 6-10 illustrate the use of multiple nitro-substituted aromatic aldehydes. Example 11 demonstrates the very broad range of dyes which can be effectively utilized. Example 12 illustrates the use of a solubilizer. Examples 13-20 illustrate the use of buffers and pH adjusters to modify aspects of the dyestuff color change reaction. Examples 21-27 relate to additional specific examples illustrating procedures for making phototranschromic films, inks, toys, and imaging materials. Example 28 relates to the preparation and use of crystalline ortho-nitrobenzaldehyde bisulfite adduct; Example 29 relates to the preparation of multilaminate films; Example 31 relates to the preparation of very thin films: Example 32 relates to the use of an anti-oxidant; Examples 33 and 34 relate to the preparation of films from multiple dyes where the films display intermediate colors that are not simple mixtures of the initial and final color states of the films and to the use of ultraviolet absorbing inks in combination therewith; and Example 35 relates the conversion of a black, white, and multiple shades of grey image into a colored image having enhanced contrast and detail. The examples which follow are for illustrative purposes and are not intended in any way to limit the scope of the Applicant's invention.

Other aspects and advantages of the present invention will be apparent upon consideration of the following representative examples.

EXAMPLE 1

Solutions for use in making films and other thin layers according to the invention, containing ortho-nitrobenzaldehyde and polyvinyl alcohol, are prepared as follows. Seven hundred mg of polyvinyl alcohol (molecular weight, ca. 86,000, Aldrich Chemical Co., Milwaukee, Wis.) is dissolved in 10 ml of boiling water and 15.5 mg (10 mM) ortho- nitrobenzaldehyde is added to the still hot solution. The solution is made 1 mM with respect to any one of the dyes set out in Table 1, below. The pH of the solution is adjusted until the dye is in its basic form by addition of 1 M sodium hydroxide in the volumes indicated.

TABLE 1

| Indicator Dye | microliters 1 M NaOH |
|---|---|
| 1. bromothymol blue | 60 |
| 2. ethyl red | 40 |
| 3. m-cresol | 60 |
| 4. neutral red | 60 |
| 5. chlorophenol red | 30 |
| 6. bromocresol green | 0 |
| 7. methyl red | 30 |
| 8. bromophenol red | 20 |
| 9. hematoxylin | 60 |
| 10. alizarin | 30 |
| 11. propyl red | 30 |
| 12. bromophenol blue | 0 |

In Example 2, a solution of an ultraviolet reactive compound, such as orthonitrobenzaldehyde, an acid-sensitive dye as set out in Table 1, and a medium, such as polyvinyl alcohol, is applied to a flat surface and allowed to evaporate, leaving a thin plastic film. Such a film is initially either blue or green, depending upon the pH adjustment of the initial solution. Upon exposure to near ultraviolet light, the orthonitrobenzaldehyde is converted to orthonitrosobenzoic acid, the acid stoichiometrically converts the dye, e.g., from its basic to its acid form, and the color of the film changes. Bromothymol blue, for example, changes from blue to green-yellow to yellow depending upon the length of exposure.

EXAMPLE 2

This example demonstrates the color changes observed for twelve different films all having different indicator dyes upon exposure to 0, 15, or 60 minutes of solar illumination.

Three 25 $\mu$L aliquots of any one of the solutions described in Example 1 are pipetted onto a glass plate and allowed to air dry for approximately one hour. The dried films are subjected to 0, 15 or 60 minutes of solar illumination on a clear February day in San Diego, Calif. and the colors noted. The observed color changes are listed in Table 2.

TABLE 2

| | OBSERVED COLOR | | |
|---|---|---|---|
| INDICATOR DYE | Initial Color | 15 min. Sunlight | 60 min. Sunlight |
| 1. bromothymol blue | blue | green-yellow | yellow |
| 2. ethyl red | yellow | red-yellow | red |
| 3. m-cresol purple | lilac | yellow | yellow |
| 4. neutral red | orange | orange | orange |
| 5. chlorophenol red | purple | yellow-purple | yellow-purple |
| 6. bromocresol green | blue | light blue | green-blue |
| 7. methyl red | yellow | yellow-red | red |
| 8. bromophenol red | purple | purple-yellow | purple-yellow |
| 9. hematoxylin | red | orange | light-orange |
| 10. alizarin | light purple | v. light purple | white |
| 11. propyl red | yellow | red-yellow | red-orange |
| 12. bromophenol blue | blue | blue | blue |

The following example, Example 3, relates to the use of ultraviolet sensitive solutions which can be applied to surfaces such as cloth, paper, cardboard, plastics, wood, metals, and the like.

EXAMPLE 3

To 10 ml of acetone 10% in polyvinyl acetate, (medium molecular weight, Aldrich Chemical Co., Milwaukee, Wis.) and 100 mM in orthonitrobenzaldehyde was added 300 $\mu$L of a 100 mM suspension of bromothymol blue in ethanol giving a final 3 mM dye concentration. 200 $\mu$L of 1 M NaOH in water was added with thorough shaking. This solution was loaded into a paint sprayer of the air brush type and applied to a cardboard surface which had been previously washed with ammonium hydroxide and air dried. Thus applied, the solution formed a blue, slightly tacky, layer which rapidly dried to the touch. When placed in direct sunlight for 30 minutes, the color changed from blue through green to yellow.

The films and coatings prepared rising polyvinyl acetate were not colorfast and lost the ability to respond to UV radiation over useful storage periods (3 to 60 days).

The following example, Example 4, demonstrates that an appropriate solid support can be employed onto which a buffer may be applied in a complex pattern.

EXAMPLE 4

A 20×20 cm plastic-backed diethylaminoethyl cellulose (DEAE) thin layer chromatography sheet (Bakerflex, J. T. Baker Chemical Co.; Phillipsburg, N.J.) was placed in an ink jet printer such as a Canon PJ 1080A and imprinted with a pattern using a 100 mM solution of sodium deoxycholate in water rather than using ink. The printed sheet was then coated with a solution of 2-ethoxy-ethoxy-ethanol, 1 mM in bromothymol blue in its basic form and 10 mM in orthonitrobenzaldehyde by spraying with an air brush. In some cases Saran TM membrane was laid over the still moist film. On exposure to ultraviolet light the image of the deposited buffer could be discerned by its retardant effect on the acidification of the indicator dye. However, when the Saran TM membrane was not present, the system was not colorfast and lost its ability, over time, to respond to UV radiation.

Various moldable plastics can also be used as the support medium as demonstrated in Example 5.

EXAMPLE 5

To 10 ml of Petrarch SS curable silicone dispersion (Petrarch Systems, Inc., Bristol, Pa.) was added 100 mg orthonitrobenzaldehyde (66 mM) and 100 μL of a 100 mM solution of erythrosin B. The dispersion was vortexed thoroughly and 4 ml was applied to a clean glass plate and allowed to dry for eight hours. The remainder was left in a 20 ml vial, where in it congealed into a soft, pliable, dry, but slightly sticky pellet. The pellet and the film from the glass plate were placed under ultraviolet illumination for twenty minutes in which time the exposed film turned from charry red to a light pink and the exposed surface, but not the interior, of the pellet did likewise. However, colorfastness was lost over time.

The following example, Example 6, compares the in situ reactivity of 2,4-dinitrobenzaldehyde to that of orthonitrobenzaldehyde in the same medium and with the same dye and demonstrates that the former aldehyde is also an effective proton progenitor compound for use in systems of the invention.

EXAMPLE 6

To 20 ml of a 10% solution of polyvinylacetate (medium molecular weight, Aldrich Chemical Co., Milwaukee, Wisconsin) in ethoxyethoxyethanol, was added 196 mg of 2,4-dinitrobenzaldehyde (50 mM) and, with considerable agitation to effect complete dissolution, 200 μL of a 100 mM aqueous solution of erythrosin B and 100 μL of a 1 M solution of sodium hydroxide.

A second solution was prepared similarly except for the substitution of 151 mg of orthonitro-benzaldehyde for the 2,4-dinitrobenzaldehyde. Both solutions were poured onto clean glass plates and allowed to evaporate for 24 hours at room temperature. Representative strips from each film were placed in direct noontime sunlight for two hours. The film containing the 2,4-dinitrobenzaldehyde turned from an intense, fluorescent fuchsia to a quiescent golden yellow. The film containing the ortho- nitrobenzaldehyde turned a reddish-orange indicative of only partial acidification of the dye.

The following two examples, Example 7 and Example 8, demonstrate the use of 2,4-dinitrobenzaldehyde with two different dyes, erythrosin B and propyl orange.

EXAMPLE 7

An acetone solution, 10% in polyvinylacetate, (medium molecular weight, Aldrich Chemical Co., Milwaukee, Wis.), 100 mM in 2,4-dinitrobenzaldehyde, and 1 mM in erythrosin B was poured onto a clean glass plate and allowed to evaporate into a thin film. When placed in direct sunlight for 45 minutes the film turned from a light fuchsia to a tangerine pink.

EXAMPLE 8

A similar film, made as in the preceding example, Example 7, but with 3 mM propyl orange and 5 mM NaOH, turned from an intense orange to an intense orange-red.

The following examples, Example 9 and Example 10, demonstrate that the amount of acid generated upon exposure to ultraviolet light is proportional to the exposure time and also depends upon the amount of photoacid progenitor substrate remaining as the reaction progresses.

EXAMPLE 9

Acidity generated by ultraviolet exposure of a polyvinyl alcohol film containing the orthonitrobenzaldehyde (ONB) bisulfite adduct (prepared according to Example 12, described below) is quantitated by titration with 10 mM NaOH. Solutions I-IV, made from aqueous solutions in the volume proportions listed in Table 3, are applied to clean glass plates where they are allowed to evaporate, depositing thin clear films on the plates.

TABLE 3

| COMPONENT | SOLUTIONS I | II | III | IV |
|---|---|---|---|---|
| 500 mM ONB sodium bisulfite complex | 5 | 10 | 5 | 5 |
| 8% polyvinyl alcohol | 40 | 40 | 40 | 40 |
| 100 mM bromothymol blue | 0 | 0 | 0.5 | 0 |
| 100 mM propyl red | 0 | 0 | 0 | 1.5 |
| water | 5 | 0 | 4.5 | 3.5 |
| 1 M NaOH | 0.5 | 0.5 | 0.5 | 0.5 |

After 8 hours drying, squares 1"×1" are cut from the films and weighed. These are exposed to a Fotodyne, (New Berlin, Wis.) ultraviolet transilluminator for periods of 0 to 240 minutes after which they are dissolved in 4 ml of water and titrated with 10 mM NaOH to the pH observed for the time zero control. In the tables below, Tables 4, 5, 6, and 7, initial pH is the pH of the exposed, dissolved, square prior to titration.

TABLE 4

Solution I; titrated to control pH 7.80 (50 mM ONB and no dye)

| Time (min) | Weight (mg) | Initial pH | Micromoles/gram required |
|---|---|---|---|
| 10 | 38.6 | 5.31 | 88 |
| 20 | 36.7 | 4.60 | 155 |
| 40 | 34.7 | 3.97 | 202 |
| 80 | 34.8 | 3.82 | 287 |
| 160 | 35.7 | 3.65 | 328 |
| 240 | 33.2 | 3.63 | 340 |

TABLE 5

| Solution II; titrated to control pH 7.09 (100 mM ONB and no dye) | | | |
|---|---|---|---|
| Time (min) | Weight (mg) | Initial pH | Micromoles/gram required |
| 10 | 57.4 | 4.84 | 96 |
| 20 | 55.6 | 4.43 | 140 |
| 40 | 58.0 | 4.32 | 157 |
| 80 | 55.2 | 4.06 | 199 |
| 160 | 57.5 | 3.88 | 231 |
| 240 | 51.8 | 3.76 | 290 |

TABLE 6

| Solution III; titrated to control pH 7.65 (50 mM ONB and 1 mM bromothymol blue) | | | |
|---|---|---|---|
| Time (min) | Weight (mg) | Initial pH | Micromoles/gram required |
| 10 | 37.7 | 5.32 | 98 |
| 20 | 36.3 | 4.88 | 151 |
| 40 | 39.1 | 4.69 | 169 |
| 80 | 38.3 | 4.44 | 204 |
| 160 | 34.8 | 4.17 | 276 |
| 240 | 33.2 | 4.06 | 292 |

TABLE 7

| Solution IV; titrated to control pH 7.43 (50 mM ONB and 3 mM propyl red) | | | |
|---|---|---|---|
| Time (min) | Weight (mg) | Initial pH | Micromoles/gram required |
| 10 | 33.7 | 5.97 | 77 |
| 20 | 36.5 | 5.24 | 93 |
| 40 | 38.3 | 4.86 | 128 |
| 80 | 36.7 | 4.63 | 153 |
| 160 | 36.3 | 4.42 | 212 |
| 240 | 37.8 | 4.26 | 193 |

EXAMPLE 10

A repetition of the preceding example, Example 9, was performed substituting 2,4-dinitrobenzaldehyde for ortho-nitrobenzaldehyde. However, due to the lower solubility of the 2,4-dinitrobenzaldehyde bisulfite adduct, it was not possible to prepare a 500 mM stock solution. Thus, 1.4 ml lM sodium bisulfite was added to 24 ml 8% polyvinyl alcohol, and to this solution was added, with heating, 250 mg 2,4-dinitrobenzaldehyde. The solution, 50 mM in 2,4-dinitrobenzaldehyde, was poured onto a clean glass plate and evaporated during which time some of the aldehyde crystallized in the film. Squares cut from this film were treated as those in Example 9 and were titrated to a control pH of 5.18. The following results were obtained.

TABLE 8

| Time (min) | Weight (mg) | Initial pH | Micromoles/gram required |
|---|---|---|---|
| 10 | 57.9 | 4.58 | 20 |
| 20 | 48.5 | 4.25 | 33 |
| 40 | 52.1 | 4.00 | 46 |
| 80 | 57.8 | 3.61 | 66 |
| 160 | 51.7 | 3.49 | 77 |
| 240 | 56.9 | 3.33 | 98 |

A very broad range of dyes can be effectively utilized as illustrated in Example 11.

EXAMPLE 11

The pH sensitive dyes in the following table were dissolved to a concentration of 1 mM (unless otherwise noted) in solutions which were 50 mM in ortho-nitrobenzaldehyde-bisulfite adduct (prepared according to Example 12, described below), and 7.2% in polyvinyl alcohol. One molar sodium hydroxide was added to the solutions until the dyes were in their basic form. The several solutions were poured onto clean glass plates and allowed to evaporate overnight. They were exposed to direct noontime sunlight for various periods of time (indicated in minutes) and their ranges of colors recorded as indicated in Table 9.

TABLE 9

| DYE | OBSERVED COLOR (time in minutes) INITIAL/INTERMEDIATE/FINAL |
|---|---|
| Alizarin, (3 mM) | violet(0)/dusty rose(5)/gold(30-180) |
| Alizarin yellow R | light yellow(0)/medium gold(30)/dark gold (90-180) |
| Alizarin red s | dusty pink(0)/orange-tan(30-180) |
| Benzopurpurin 4B | red(0 to 180) |
| 4,4'-bis(4-amino-1-naphthyl-azo)-2,2'-stilbene-disulfonic acid | violet(0)/red-brown(30-180) |
| Brasiline | turquoise(0)/lavender (5)/dusty rose(10)/orange-tan(30-180) |
| Bromocresol green | royal green(0)/dark green(5-180) |
| Bromocresol purple | purple(0)/dark brown(5)/dark olive(30)/light olive(90-180) |
| Bromophenol blue | purple(0)/dark green-green(5-180) |
| Bromophenol red | red-brown(0)/golden brown(5)/brown(30-180) |
| Bromothymol blue | royal blue(0)/dark green(5)/gold(45-180) |
| Bromoxylenol, (3 mM) | dark blue(0)/dark green(5-180) |
| Carminic acid | pink-violet(0)/light pink(5)/coral(30-180) |
| Chlorophenol red | burgundy(0)/golden brown(5)/yellow(15-180) |
| Congo red | salmon(0)/subtle change to dark salmon at 180 |
| o-Cresolphthalein | initial color is unstable even in absence of illumination |
| m-Cresol purple | navy blue(0)/yellow(5)/gold(30-180) |
| Cresol red | burgundy(0)/golden brown(5)/gold(15-180) |
| Curcumin | reddish brown(0)/light yellow(5)/gold(30-180) |
| 3-(4-Dimethylamino-1-naphthyl-azo)-4-methoxybenzene-sulfonic acid | light yellow(0)/light tan(90-180) |
| 4-(4-Dimethylaminophenylazo benzoic acid | dye precipitates from solution |
| Direct red | electric magenta(0)/scarlet to scarlet-red(30-180) |
| Eriochrome black T | turquoise(0)/dark tan(15-180) |
| Erythrosin B, (2 mM) | burnt pink(0)/dark pink(5)/orange(30-180) |
| 4-(4-Ethoxyphenylazo)-3-phenylene-diamine hydrochloride | yellow(0)/light gold(5)/dark gold(15-180) |
| Ethyl orange | gold(0)/dark gold(5)/orange(30-180) |
| Ethyl red | yellow(0)/light pink(5)/medium pink to reddish pink(10-180) |

TABLE 9-continued

| DYE | OBSERVED COLOR (time in minutes) INITIAL/INTERMEDIATE/FINAL |
|---|---|
| Ethyl violet | medium blue(0)/blue-grey(90–180) |
| Hematoxylin | beige(0)/light beige(5)/yellow-tan(30–180) |
| Lacmoid | grayish-turquoise(0)/dark brown(30–180) |
| Litmus | cornflower blue(0)/lavender(5)/orange-tan(30–180) |
| Metanil yellow | yellow(0)/gold(90–180) |
| Methyl green | aqua blue(0)/aqua green(90–180) |
| Methyl red, (6 mM) | yellow(0)/orange(5)/red(10)/scarlet(30–180) |
| Naphtholphthalein | bismuth grey(0)/clear(5)/yellow-tan(30–180) |
| Naphthyl red hydrochloride | dye precipitates from solution |
| Neutral red, (3 mM) | orange-tan(0)/light red(5)/dark orange-tan(30–180) |
| Nile blue A | sky blue(0)/light green(10)/swamp green(30–180) |
| 2-Nitrophenol | dye degrades under ultraviolet illumination |
| 3-Nitrophenol | dye degrades under ultraviolet illumination |
| 4-Nitrophenol | dye degrades under ultraviolet illumination |
| Orange I | red(0)/orange(5–180) |
| 4-(Phenylazo)diphenylamine | light yellow(0)/light beige(90–180) |
| Phenol red | scarlet-red(0)/red(5)/gold(10–180) |
| Propyl red, (3 mM) | gold(0)/red(5)/scarlet-red(30–180) |
| Resazurin, (2 mM) | dark purple(0)/dk. brown-red(5)/red(30)/dark orange(45–180) |
| Thiazole yellow G | yellow(0–180) |
| Thymol blue | light olive(0)/light gold(5)/dark gold(30–180) |
| Thymolphthaleine | initial color is unstable in absence of illumination |
| Tropaeoline OO | gold(0)/medium gold(30)/dark gold(90–180) |
| p-Xylenol blue | dark olive(0)/gold(5–180) |

Films fabricated with a hydrophilic polymer as polyvinyl alcohol exhibited incompatibility of the ortho-nitrobenzaldehyde (ONB) compound when utilized in levels about 10 mM. In order to use ONB in aqueous solutions at higher levels and to prevent crystallization or powdering when formed into a film, it is necessary to convert the aldehydes into a water soluble adduct: This was accomplished by preparing an ONB bisulfite adduct, thereby allowing the use of much higher concentrations of ONB in the film. The presence of relatively high amounts (≧ 25 mM) of ONB in the film results in a film that responds more rapidly to UV radiation.

Example 12 illustrates the preparation of aldehyde bisulfite adducts. Examples 13–16 relate to procedures wherein a necessarily high concentration of ortho-nitrobenzaldehyde bisulfite adduct is utilized which is higher than the concentration obtainable without a solubilizing agent such as bisulfite. Examples 15–16 contain, in addition, the buffer, Tris-HCl.

EXAMPLE 12

The preparation of aldehyde bisulfite adducts is accomplished as follows. To 400 ml of a solution containing 20.9 grams sodium metabisulfite (550 mM) in water is added 30.2 grams orthonitrobenzaldehyde. The solution is stirred and brought to 60° C. The aldehyde dissolves slowly, and remains in solution after the temperature is lowered. In contrast, addition of the bisulfite to a heated suspension of the aldehyde in water does not result in a clear solution, nor does adding both aldehyde and bisulfite to heated water.

Similar procedures, applied to 2,4-dinitrobenzaldehyde, 3,5-dinitrobenzaldehyde, and 0-nitrocinnamaldehyde, were effective in solubilizing these aldehydes up to a concentration of 50 mM.

EXAMPLE 13

Solutions were prepared as in Example 1 except that the ortho-nitrobenzaldehyde was added as a solution of its bisulfite adduct in a 10% excess of sodium bisulfite. The concentration of ortho-nitrobenzaldehyde bisulfite adduct in the final solutions was 25 mM. All other concentrations were similar to those in Example 1. The pH of the solutions was adjusted as indicated in Table 10.

TABLE 10

| INDICATOR DYE | microliters 1 M NaOH |
|---|---|
| 1. bromothymol blue | 40 |
| 2. ethyl red | 30 |
| 3. m-cresol purple | 50 |
| 4. neutral red | 50 |
| 5. chlorophenol red | 40 |
| 6. bromocresol green | 0 |
| 7. methyl red | 20 |
| 8. bromophenol red | 40 |
| 9. hematoxylin | 100 |
| 10. alizarin | 60 |
| 11. propyl red | 20 |
| 12. bromophenol blue | 0 |

EXAMPLE 14

Three 25 μL aliquots of the solutions of Example 13 are pipetted onto a glass plate and allowed to air dry for approximately 1 hour. The dried films are subjected to 0, 15 or 60 minutes of solar illumination on a clear February day in San Diego, Calif. and the colors noted. The observed color changes are listed in Table 11.

TABLE 11

| INDICATOR DYE | OBSERVED COLOR Initial Color | 15 min. Sunlight | 60 min. Sunlight |
|---|---|---|---|
| 1. bromothymol blue | green | green-yellow | yellow |
| 2. ethyl red | yellow | red-yellow | red |
| 3. m-cresol purple | lilac | yellow | yellow |
| 4. neutral red | orange | orange | orange |
| 5. chlorophenol red | purple | yellow-purple | yellow |
| 6. bromocresol green | blue | lt. blue | green-yellow |
| 7. methyl red | yellow | yellow-red | red |
| 8. bromophenol red | purple | purple-yellow | yellow |
| 9. hematoxylin | red | orange | light |

TABLE 11-continued

| INDICATOR DYE | OBSERVED COLOR Initial Color | 15 min. Sunlight | 60 min. Sunlight |
|---|---|---|---|
| | | | yellow |
| 10. alizarin | light purple | v. light purple | light yellow |
| 11. propyl red | yellow | red-yellow | yellow-pink |
| 12. bromophenol blue | blue | blue | green-yellow |

EXAMPLE 15

To one-ml aliquots of the solutions of Example 13 is added 6 μL of 1 M Tris-HCl at pH 8.0. This is equivalent to 3 mM titratable Tris base in the final solutions. Three 25 μL aliquots of the resulting solutions are pipetted onto a glass plate and allowed to air dry. The drying is complete in one hour. The dried films are subjected to 0, 15, or 60 minutes of solar illumination on a clear February day in San Diego, California and the colors noted. The observed color changes are listed in Table 12.

TABLE 12

| INDICATOR DYE WITH 3 mM Tris-HCl | OBSERVED COLOR Initial Color | 15 min. Sunlight | 60 min. Sunlight |
|---|---|---|---|
| 1. bromothymol blue | blue-green | green | yellow |
| 2. ethyl red | yellow | yellow-red | red |
| 3. m-cresol purple | yellow-green | yellow-green | yellow |
| 4. neutral red | orange | orange | orange |
| 5. chlorophenol red | purple | purple | yellow |
| 6. bromocresol green | blue | blue | yellow-green |
| 7. methyl red | yellow | red-yellow | red |
| 8. bromophenol red | purple | purple | yellow |
| 9. hematoxylin | red | light red | light yellow |
| 10. alizarin | light purple | light purple | light yellow |
| 11. propyl red | yellow | yellow-red | yellow-pink |
| 12. bromophenol blue | blue | blue | green |

EXAMPLE 16

To one-ml aliquots of the solutions of Example 13 is added 16 μL of 1 M Tris-HCl at pH 8.0. This is equivalent to 8 mM titratable Tris base in the final solutions. Three 25 μL aliquots of the resulting solutions are pipefitted onto a glass plate and allowed to air dry. The drying is complete in one hour. The dried films are subjected to 0, 15, or 60 minutes of solar illumination on a clear February day in San Diego, Calif. and the colors noted. The observed color changes are listed in Table 13.

TABLE 13

| INDICATOR DYE WITH 8 mM Tris-HCl | OBSERVED COLOR Initial Color | 15 min. Sunlight | 60 min. Sunlight |
|---|---|---|---|
| 1. bromothymol blue | blue-green | blue-green | yellow |
| 2. ethyl red | yellow | yellow | red |
| 3. m-cresol purple | yellow-green | yellow-green | yellow |
| 4. neutral red | orange | orange | orange |
| 5. chlorophenol red | purple | purple | yellow |
| 6. bromocresol green | blue | blue | yellow-green |
| 7. methyl red | yellow | yellow | red |
| 8. bromophenol red | purple | purple | yellow |
| 9. hematoxylin | red | red | light yellow |
| 10. alizarin | light purple | light purple | light yellow |
| 11. propyl red | yellow | yellow | yellow-pink |
| 12. bromophenol blue | blue | blue | green |

Examples 17 and 18, relate to the advantageous use of buffering agents, such as Tris-HCl, or deoxycholate, to lengthen the time in which a color change is observed and to detect an increased amount of ultraviolet radiation.

EXAMPLE 17

To one-ml aliquots of the solutions described in Example 13, is added 6 μL of 1 M Tris-HCl at pH 8.0. This is equivalent to 3 mM titratable Tris base in the final solution. Three 25 μL aliquots of any one of the resulting solutions are pipefitted onto a glass plate and allowed to air dry. The drying is complete in one hour. The dried films are subjected to 0, 15, or 60 minutes of solar illumination on a clear February day in San Diego, Calif. and the colors noted. The observed color changes are listed in Table 14.

TABLE 14

| INDICATOR DYE WITH 3 mM Tris-HCl | OBSERVED COLOR Initial Color | 15 min. Sunlight | 60 min. Sunlight |
|---|---|---|---|
| 1. bromothymol blue | blue-green | green | green |
| 2. ethyl red | yellow | yellow-red | red-yellow |
| 3. m-cresol purple | yellow-green | yellow-green | yellow |
| 4. neutral red | orange | orange | orange |
| 5. chlorophenol red | purple | purple | purple |
| 6. bromocresol green | blue | blue | light green-blue |
| 7. methyl red | yellow | red-yellow | red-yellow |
| 8. bromophenol red | purple | purple | purple |
| 9. hematoxylin | red | light red | light brown |
| 10. alizarin | light purple | light purple | v. light purple |
| 11. propyl red | yellow | yellow-red | yellow-red |
| 12. bromophenol blue | blue | blue | blüe |

EXAMPLE 18

To one-ml aliquots of the solutions of Example 13 is added 16 μL of 1 mM Tris-HCl at pH 8.0. This is equivalent to 8 mM titratable Tris base in the final solution.

Three 25 μL aliquots of any one of the resulting solutions are pipefitted onto a glass plate and allowed to air dry. The drying is complete in one hour. The dried films are subjected to 0, 15, or 60 minutes of solar illumination on a clear February day in San Diego, Calif. and the colors noted. The observed color changes are listed in Table 15.

TABLE 15

| INDICATOR DYE WITH 8 mM Tris-HCl | OBSERVED COLOR Initial Color | 15 min. Sunlight | 60 min. Sunlight |
|---|---|---|---|
| 1. bromothymol blue | blue-green | blue-green | blue-green |
| 2. ethyl red | yellow | yellow | yellow |
| 3. m-cresol purple | yellow-green | yellow-orange | yellow-green |
| 4. neutral red | orange | orange | orange |
| 5. chlorophenol red | purple | purple | purple |
| 6. bromocresol green | blue | blue | blue |
| 7. methyl red | yellow | yellow | yellow |
| 8. bromophenol red | purple | purple | purple |
| 9. hematoxylin | red | red | light red |
| 10. alizarin | light purple | light purple | light purple |
| 11. propyl red | yellow | yellow | yellow-orange |
| 12. bromophenol blue | blue | blue | blue |

The following example, Example 19, demonstrates the retardant effect of sodium deoxycholate upon the acidification of the dye and also demonstrates the use of a liquid medium contained in a Saran TM plastic wrap support.

EXAMPLE 19

A solution of 2-ethoxy-ethoxy-ethanol is made 1.0 M in ortho-nitrobenzaldehyde and 10 mM in bromothymol blue. The pH of the solution is adjusted to pH 9.2 by addition of 400 μL 1 M NaOH to a 22 ml volume of solution. At this pH, bromothymol blue has a deep blue-green color. A second solution is similarly prepared except that in addition it is made 100 mM in sodium deoxycholate. Mixture of these two solutions in proportions of 9:1 and 4:1 provides solutions respectively 10 mM and 20 mM in deoxyoholate. These solutions, when exposed to direct sunlight undergo a color change to yellow in the following times: 0 deoxycholate, 5 minutes; 10 mM deoxycholate, ca. 20 minutes; and 20 mM deoxycholate, ca. 30 minutes.

Similar solutions, 25, 50, 75 and 100 mM in deoxycholate were sealed into adjacent segments between two sheets of heat sealable plastic using a hot wire.

These sections changed color from dark blue-green to yellow in 22, 45, 80 and 120 minutes, respectively. In a similar experiment employing chlorophenol red, the color change from violet red to yellow occurred in 15, 30, 38 and 50 minutes at the progressively higher concentrations of deoxycholate.

The use of a pH adjuster for the purpose of extending the temporal elements of the color transitions possible for a particular dye is illustrated in the following example, Example 20. The addition of the pH adjuster differs from the addition of a buffer. While both a buffer and a strong base extend the time required for a color transition to occur, only a strong base will always alter the initial pH and corresponding initial color.

EXAMPLE 20

Ten ml of 7.2% polyvinyl alcohol was made 1 mM in bromothymol blue and 50 mM in a bisulfite adduct of ortho-nitrobenzaldehyde. Addition of 100 μL of 1.0 M NaOH results in a color change from the yellow acid form of the dye to the blue basic form. An equivalent amount of titratable phosphate added to the original solution as a potassium phosphate buffer at pH 6, allows for the formulation of a film which will turn yellow after the same amount of illumination as the film to which sodium hydroxide was added, but which will be initially green rather than initially blue.

Examples 21, and 22 relate to systems which can be used for quantifying exposure to ultraviolet radiation in a variety of settings including persons or objects exposed to natural or artificial sources.

EXAMPLE 21

A buffer, such as sodium deoxycholate, is applied in the form of a concentration gradient from 0 to 20 mM of across the long axis of a thin strip plastic backing coated with diethylaminoethyl cellulose. Several coats of a solution 8% in polyvinyl alcohol, 50 mM in ortho-nitrobenzaldehyde bisulfite adduct, 1 mM in bromothymol blue, and 10 mM in NaOH is applied with an aspirator type sprayer to the strip. Being more basic than the dye, the deoxycholate functions as a buffer and proportionally attenuates the appearance of a color change progressively from one end of the strip to the other. Graduations written across the top of the strip indicate ultraviolet exposure and are read by their alignment with the interface between the basic and acidic colors of the dye.

Alternatively, one or more dyes, or the buffer, are deposited in various patterns to provide for more complex and/or visually appealing responses to light. By use of a computer controlled printing process for deposition of buffer and/or dyes, considerable complexity can be generated including graphic and alphanumeric patterns.

EXAMPLE 22

In this example embodiments are described as useful for measuring the amount of incident ultraviolet light over an extended period of time by the juxtaposition of variously reactive formulations.

Each formulation may contain the same dye; however, for visual interest several dyes may be used. Each formulation has a proportionally greater amount of buffer, and so is more or less reactive. The formulations can be cut into squares for example or any other suitable shape. Various polyvinyl alcohol formulations are prepared, as previously described in Examples 17 and 18, each containing for example a two-fold increase in the amount of buffer present. That is, the first formulation contains X amount; the second contains 2X; the third, 4X; the fourth, 8X; and up to 512X if, for example, ten formulations are chosen. One or more dyes may be used and appropriate color standards are provided for each dye employed. Numbers beside each progressively more heavily buffered square indicate how much ultraviolet radiation is required to cause a change of color and the total exposure is readily discerned by comparing the test squares to the standard squares.

Three rows of squares, cut from different polyvinyl alcohol formulations, are applied to a plastic strip. One of the outer rows represents the standard color for each dye in its initial/basic color state and the other outer row represents the standard color for each dye in its final/acidic stage. The middle row is the test row which changes color to an extent dependent upon the amount of incident ultraviolet light exposure. As the amount of exposure increases, the number of squares which have changed color from the initial to final color will increase. The total number of squares which have changed color is a direct indication of the total amount of exposure to ultraviolet light.

The devices described in Examples 21 and 22, may be supplied in light secure packaging from which they are removed and applied to a surface, such as skin or clothing, by means of an adhesive backing which is exposed by removing a protective film, not unlike a self-adhesive bandage. Alternatively, the devices described above may be applied through use of other means such as badges or bracelets having slots which receive and protect the devices.

Alternatively the devices may be coated on the sunward surface with a material, such as collagen, which has an affinity, quantitatively similar to that of human skin, for one or more brands of commercial sunscreen ointment. Sunscreen is applied to the device so that the device and can thereby be used to monitor the effectiveness of the ultraviolet blocking action of residual sunscreen even as it is being washed or worn off over extended periods.

The following example, Example 23, illustrates a procedure for making phototranschromic inks which can be effectively used on a variety of surfaces such as cloths, papers, cardboards, and other receptive surfaces, and which can be adapted for a variety of commercial and industrial applications where it is advantageous to create phototranschromic effects.

EXAMPLE 23

An ink was compounded in the following manner. An aqueous solution containing 20% diethylene glycol and 0.8% polyvinyl alcohol was made 200 mM in the bisulfite adduct of orthonitrobenzaldehyde, 10 mM in bromophenol blue and 20 mM in NaOH. When applied to paper with a brush, the ink adhered smoothly and dried rapidly. The color was deep blue which changed through green to yellow under direct solar illumination for about half an hour.

Alternatively, multiple inks or paints can be made to all initially appear the same color, but which upon subsequent exposure to ultraviolet light develop into multiple colors, These inks may be prepared as in Example 23, using any single dye or appropriate combination of dyes as in Example 24.

The following example illustrates the use of a pH sensitive dye in combination with a relatively pH insensitive dye to modify the initial and final color states obtainable.

EXAMPLE 24

Xylene cyanol, a relatively pH insensitive blue dye is combined with ethyl orange, a pH sensitive dye, yellow in its basic state and red in its acidic state. An 8.5% solution of polyvinyl alcohol is made 50 mM in the bisulfite adduct of ortho-nitrobenzaldehyde and 10 mM in NaOH. Dyes are added in the concentrations listed below and the solutions are applied to glass plates and allowed to evaporate into thin films. The films are exposed to direct sunlight for 90 minutes and the initial and final colors are as listed in Table 16.

TABLE 16

| Ethyl orange Initial/Final | Xylene cyanol | Colors |
|---|---|---|
| 1.0 mM | 1.0 mM | bright med. green/ smokey purple |
| 1.0 mM | 0.5 mM | bright med. green/ greenish purple |
| 1.0 mM | 0.2 mM | light blue-green/ reddish green |
| 0.2 mM | 0.2 mM | yellow-green/ light burgundy |

Plastics can be formed or molded into various shapes, such as toys, which upon subsequent exposure to ultraviolet light develop multiple colors. The following example describes a method for constructing three-dimensional silicone objects the color of which can be transformed by ultraviolet light.

EXAMPLE 25

To 100 ml of Petrarch SS curable silicone dispersion (Petrarch Systems, Inc., Bristol, Pa.) was added 750 mg orthonitrobenzaldehyde, and a solution consisting of 1 ml of 100 mM chlorophenol red in ethanol to which had been added 1 ml of 1.0 M NaOH. The thick dispersion was a deep reddish-purple and was placed in a 500 ml beaker for several days after which it was dry, firm, and pliable and could be easily cut with a sharp blade. Several geometrical shapes were cut from this material and when illuminated with ultraviolet radiation for an hour, the illuminated surface changed color from purple to yellow. However, the silicone systems discolored over time and became inactive to the action of UV radiation.

Example 26 relates to phototranschromic materials which can be used in conjunction with photographic negatives or transparencies to produce modified images wherein contours and shapes in the photographic image are rendered in the phototranschromic materials into colors which are inherent in the phototranschromic material.

EXAMPLE 26

Images can be prepared in which negatives or transparencies are placed on a sheet of the ultraviolet reactive materials and exposed to ultraviolet light.

The ultraviolet light is selectively transmitted depending upon the image present in the negative or transparency so that color changes will only occur where the ultraviolet light is transmitted.

A black and white 35 mm negative developed from an exposure of Kodak TM Tri-X film is held in place between a section of the film described in Example 14 and a source of ultraviolet illumination for thirty minutes. A clearly defined image is produced on the phototranschromic film wherein the darker areas of the Kodak TM negative are rendered in reddish browns, the lighter parts of the Kodak TM negative are rendered in yellow and the grey tones are rendered in intermediate shades.

The following example, Example 27, demonstrates the use of phototranschromic films to create images of various three-dimensional templates juxtaposed between the film and a source of ultraviolet illumination.

EXAMPLE 27

One hundred ml of a solution of 8% polyvinyl alcohol, 50 mM in the bisulfite adduct of ortho-nitro-benzaldehyde and 10 mM in NaOH is poured onto a glass plate and allowed to evaporate for 16 hours. The dried film covers 780 square centimeters and is dark red-brown. A section of the film is placed on the flat surface in direct sunlight for 30 minutes with a coiled wire on its sunward side. The shadow of the coil leaves a relatively unchanged red-brown image on a background which turns yellow. The image is sharp and stable after the film is removed from the sunlight.

The use of a crystalline bisulfite adduct of ortho-nitrobenzaldehyde, rather than the adduct prepared in situ as described in Example 12, requires an extra preparative step but confers several advantages. First, the crystallized material represents a relatively purified source of ortho-nitrobenzaldehyde as compared to the commercially available aldehyde. Second, the ratio of aldehyde to bisulfite is fixed by the stoichiometry of the chemical interaction rather than a weighing operation, and is therefore more reliably reproducible. Third, no excess of bisulfite (which acts as a buffer in certain pH ranges) is required to produce a clear solution, as is necessary in the case of the in situ preparation of the adduct as described in Example 12. Example 28 relates to the preparation and use of a crystalline ortho-nitrobenzaldehyde bisulfite adduct which can be used in all of the previous examples to replace in situ generated orthonitrobenzaldehyde bisulfite adduct.

EXAMPLE 28

A. Preparation of Crystalline Bisulfite Adduct

To prepare the ortho-nitrobenzaldehyde bisulfite adduct, approximately equal molar amounts of sodium bisulfite and ortho-nitrobenzaldehyde are used. For example, one hundred grams of sodium bisulfite are dissolved in 200 ml of water, at room temperature. A mixture of 132 grams of ortho-nitrobenzaldehyde in 100 ml ethanol is dissolved by heating and is immediately added with stirring to the sodium bisulfite solution. The solution of ortho-nitrobenzaldehyde and bisulfite is protected from light and left overnight at room temperature are filtered and rinsed with ethanol prior to drying at room temperature.

B. Use of Crystalline Bisulfite Adduct

To 1000 ml of an 8% polyvinyl alcohol solution is added 6.37 g of ortho-nitrobenzaldehyde sodium bisulfite crystals (25 mM) (as prepared in part A), 258 mg of methyl green (Eastman Kodak, Rochester, N.Y.) dissolved in 10 ml of $H_2O$ (0.5 mM) and 20 ml of 1.0 M NaOH (2 mM). The solution is mixed and poured onto a clean glass plate and allowed to dry at room temperature, at approximately 60% relative humidity, for 24–48 hours or until dry to the touch. Upon exposure to UV light, the film undergoes a color change from light blue to a deep forest green.

The following example, Example 29 relates to the preparation of multilaminate films. There are multiple advantages to using an arrangement, such as a laminate, of two separately produced layers of film rather than combining several dyes in the same active layer. One is that the multiple dyes can be initially set to a different pH. Second, buffers can be added independently to either layer to prolong or shorten the color transition period. Third, the shielding of lower layer(s) from ultraviolet radiation by upper layer(s) causes a differential rate of activation to occur in the different lower layers.

EXAMPLE 29

A solution of 8% polyvinyl alcohol, 25 mM in the crystalline bisulfite adduct of orthonitrobenzaldehyde and 0.5 mM in bromophenol blue is brought to pH 4.4 with 1 M NaOH and poured (cast) onto a clean glass plate. A second solution of 8% polyvinyl alcohol, 25 mM in the bisulfite adduct of ortho-nitrobenzaldehyde and 0.15 mM in methyl orange is brought to pH 4.6 with 1 M NaOH and poured (cast) onto a second clean glass plate. Both solutions are allowed to evaporate at room temperature and at approximately 60% relative humidity for 24-48 hours until dry to the touch. The two types of film thus produced can be laminated together using, for example, a clear polyethylene film coated on both sides with acrylic adhesive. The lamination can also be accomplished in other ways; for instance a thin layer of an acetone solution of polyvinylacetate may serve to join two polyvinyl alcohol films together.

Next, the methyl orange side, for example, of the compound film thus produced is attached to a white vinyl backing coated with a similar adhesive. This assembly, when subjected to varying amounts of UV radiation, e.g,, from 1.5 to 10 Joules/cm$^2$, changes from an initial color of medium blue, to light green, to clear yellow, to light orange, to orange-red. Similar laminations or juxtapositions, using two or more layers of other films, prepared as described in the previous examples, have been produced with similarly effective results.

The choice of film thickness depends upon a balancing of at least two factors including: i) the advantageous shorter drying times associated with using thinner films and ii) the concomitant decreased optical density of thinner films and resultant decreased color intensity. Very thin films, for example thinner than 10 microns, are easier to manufacture in a continuous process due to their shorter drying times. High dye concentrations, to compensate for the decreased optical density, of up to 10 mM, can be used. In Example 30, mixtures of dye components are shown to lead to films which produce ranges of color changes which are more diverse and useful than those fabricated with a single dye. Often the effect of including multiple dyes in the film is to yield more color changes in a serial manner. Also, the use of multiple dyes makes available more aesthetically appealing color combinations than is available through single dye formulation. The ultimate colors and intermediate color changes are not readily predicted from the observation of single dye films.

EXAMPLE 30

To 10 ml. of an aqueous solution containing 8% (wt/vol.) polyvinyl alcohol (Vivol 1 25, Air Products), 25 mM ortho nitro benzaldehyde and 28 mM sodium bisulfite was added 0.01 millimolar of two dyes as listed in Table 17. Initial pH were adjusted to the high limit of the mutual indicator system with the addition of 1 Molar sodium hydroxide solutions. The mixtures were case onto glass plates and allowed to air dry overnight. Each combination was exposed to natural sunlight and evaluated for color change and appearance of in Table 17.

TABLE 17

| DYE MIXTURE | INITIAL COLOR | FINAL COLOR | COMMENTS |
|---|---|---|---|
| 1. Alizarin Yellow | pink- | pink- | subtle |

TABLE 17-continued

| DYE MIXTURE | INITIAL COLOR | FINAL COLOR | COMMENTS |
|---|---|---|---|
| R Alizarin | violet | yellow | |
| 2. Alizarin Yellow R Lacroid | blue-green | army-green | indistinct |
| 3. Alizarin Yellow R Resazurin | light-purple | reddish-purple | indistinct |
| 4. Alizarin Yellow R Indigo Carmine | yellow | yellow | no change |
| 5. Alizarin Yellow R 4 Amino Azobenzene | yellow | yellow | no change |
| 6. Alizarin Lacroid | blue | black | |
| 7. Alizarin Resazurin | violet | red-violet | crystal-lites found in film |
| 8. Lacroid Resazurin | blue | dark-purple | |
| 9. Lacroid Carminic Acid | blue | ugly-green | poor colors |
| 10. Indigo Carmen Carminic Acid | light blue | tan | |
| 11. Bromophenol Blue Chlorophenol Red | blue | blue/green | poor change |
| 12. Bromophenol Blue Ethyl Violet | light blue | dark blue | very distinct |
| 13. Bromophenol Blue Ethyl Red | blue | light green | |
| 14. Chlorophenol Red Neutral Red | light violet | orange | wine color |
| 15. Chlorophenol Red Ethyl Red | grey-purple | orange | |
| 16. Chlorophenol Red Methyl Red | purple green | violet | indistinct |
| 17. Orthocresol Purple Bromophenol Blue | blue | orange | very distinct changes |
| 18. Aniline Blue Phenol Red | reddish purple | green | distinct changes |
| 19. Nile blue Methyl Red | light green | red | |

EXAMPLE 31

An aqueous solution 4% in polyvinyl alcohol, 25–50 mM in the bisulfite adduct of orthonitrobenzaldehyde, and from 0.1 to 10 mM in aniline blue and from 0.1 to 10 mM in phenol red, preferably in a ratio of aniline blue to phenol red of 2 to 5, and 10 mM in NaOH, is poured onto a glass plate. The solution is spread into a layer, ca. 100 microns thick, and is allowed to dry into a layer ca. 10 microns thick. The film thus produced is a reddish purple initially and upon ultraviolet irradiation changes through orange to yellow and finally to green. Prior to removal from the glass plate, the thin film is attached to a white vinyl adhesive backing to protect it from mechanical deformation upon separation and during later handling. A thin layer of Mylar TM, or some other moisture barrier, is attached via an acrylic adhesive transfer tape to the unbacked side of the film to further protect it.

EXAMPLE 32

It has been observed that, for certain dyes, a discoloration of the post-ultraviolet irradiation color sometimes occurs. To prevent this post-irradiation discoloration, it has been found that a suitable antioxidant, such as hexamethylenetetramine (0.02 to 0.05% w/v) can be added to the film formulations prior to casting.

Ultraviolet light reactive films of the invention, also referred to as "polychromatic" films, can be made which pass through several different and distinct colors in response to increasing amounts of ultraviolet light. The polychromatic films display intermediate colors which are not simple mixtures of the initial and final colors. Example 31 relates to such a film which is made from the mixture of aniline blue and phenol red and which changes from purple to red to yellow to green. The intermediate colors observed, e.g., red and yellow, are not simple mixtures of the initial (purple) and final (green) color states.

Various compounds which are transparent in the visible range but which strongly absorb in the ultraviolet range can be used in combination with the films of the invention to modify the films' responsiveness to ultraviolet radiation. If a layer of a transparent plastic, on which is deposited various amounts of such a compound, such as Cyasorb UV24 TM, or Cyasorb UV9 TM, etc, (American Cyanamid, Bridgewater, New Jersey) is laminated over a layer of the films of the invention, the color change response to ultraviolet light will be altered in proportion to the amount of Cyasorb TM which effectively "masks" any given area.

If desired, complex patterns of Cyasorb UV24 TM can be applied to a transparent plastic layer by incorporating the Cyasorb TM directly into a printing ink and applying the printing ink to the plastic with, for example, a printing press. Several different inks can be prepared, containing different concentrations of Cyasorb TM and, when these different concentrations are used in a multi-color printing process, as though they were different colors of ink, the pattern, or picture, applied to the transparent plastic film can be "transferred" to an underlying layer of polychromatic films, such as those films described in Example 14 or in Example 31, by exposing the entire laminate assembly to a specified amount of ultraviolet light.

Alternatively, the printing of patterns with ultraviolet absorbing inks may be done directly onto the polychromatic films. Ideally, in this latter process, the inks used should be both chemically and physically compatible with the polychromatic films, i.e, the inks must not exhibit acid-base reactions in the working pH range of the films of the invention or chemically interfere in any other way.

Various interesting versions of an ultraviolet dosimeter are possible utilizing the two modifications described above. For example, various patterns, letters, numbers, and pictures can be directly and readily incorporated into a strip without any manufacturing difficulty. Examples of both modifications are described below in Examples 32 and 34.

EXAMPLE 33

Polyvinylalcohol (PVA) films were cast from solutions containing 0.2 mM aniline blue, 0.5 mM phenol red, and 25 mM ortho-nitrobenzaldehyde bisulfite adduct, which solutions had been titrated to pH 9.0 by the addition of 1 M sodium hydroxide. Ultraviolet absorbing inks were made by dissolving Cyasorb UV24 TM into a transparent ink (Nazdar 70-170, Naz-dar Company, Chicago, Ill.). Using 390 mesh calendared screens and these inks, a rectangular array pattern was printed onto the polychromatic films. Three inks with concentrations of Cyasorb UV24 TM of 4%, 8%, and 16%, respectively, were used in conjunction with patterns in three screens, so as to deliver combinations of the three inks resulting in eight separate rectangles ranging from 0% in the upper left hand corner to 40% in the lower right hand corner. The film so obtained was dried and was initially a uniform shade of purple. When placed in bright sunlight for approximately 40 minutes, the "invisible" latent pattern became "visible" as a pattern of variously colored rectangles. The upper left hand rectangle was dark green (0%) and the lower right hand rectangle (40%) was still the original color of the film, e.g., purple. The other rectangles were red, yellow, and light green, in a regular pattern as shown in Table 18, below.

TABLE 18

| | |
|---|---|
| 0% Dark Green | 4% Green |
| 8% Light Green | 12% Green-Yellow |
| 16% Yellow | 20% Yellow-Red |
| 24% Red | 40% Purple |

EXAMPLE 34

A pattern of ultraviolet inks was printed onto a 92 gage Melinex 401 clear polyester film obtained from ICI Americas, Inc., Wilmington, Del. This polyester film was then laminated to several different previously prepared films of the invention prepared according to Example 33. When the laminated layers were exposed to ultraviolet light, the initially "invisible" pattern printed onto the polyester became "visible" in the form of an array of colored rectangles as described previously in Example 33.

In addition, by overlaying a piece of the polychromatic films with a photographic negative, such as a medical x-ray plate, similar effects can be produced. Significantly, an enhancement of the visually perceivable contrast and detail is obtained by "converting" the black/white/grey image of the x-ray into a color image in which the various shades of grey are "converted" and then represented as distinct colors.

EXAMPLE 35

An autoradiogram of a DNA sequencing gel is a pattern in black, white and various shades of grey representative of the positions of bands containing radioactive DNA in an analytical polyacrylamide gel. When such an autoradiogram was placed between an ultraviolet light source and film, as the one described in Example 33, a replica of the photographic pattern was created in which the black spots were purple, the clear background was green and the intermediate shades of grey ranged from red to yellow. This pattern of colors, and specifically the substitution of yellow or red for grey tones, where yellow or red are not intermediate colors in an additive sense between purple and green, enhances the detail and the contrast apparent to the human observer.

EXAMPLE 36

Two films prepared as detailed in Example 30 and corresponding to Examples 17 and 18 in Table 17 were cut into $\frac{1}{4}$ "by 1" strips placed into small vials and subjected to accelerated aging at 60 degrees C until visual indication of a change from the original color was observed. Example 17 in Table 17 corresponds to a low pH formulation (pH $<7$) and exhibited excellent thermal stability being unchanged after 3 months at 60 degrees C. Example 18 in Table 17 corresponds to a high pH formulation (pH $>7$) and exhibited very poor thermal stability having changed in color after 24 hours at 60 degrees C.

The foregoing illustrative examples relate to systems responsive to and for visualization of ultraviolet radiation. While the present invention has been described in terms of specific methods and compositions, it is understood that variations and modification will occur to those skilled in the art upon consideration of the present invention.

For example, it is envisioned that various compounds capable of generating a proton or hydrogen ion upon exposure of ultraviolet light will be effective according to the present invention. Although the preferred compounds are ortho-nitrobenzaldehyde; 2,4-nitrobenzaldehyde; ortho-nitrocinnamaldehyde; and 2,6-dinitrobenzaldehyde; it is not intended to preclude others such as any aromatic ortho-nitro formyl compound or any other effective compound from being included in the scope of the present invention.

Inasmuch as other aromatic ortho-nitro formyl compounds, are classified with orthonitrobenzaldehyde as regards their ability to generate proton upon exposure to ultraviolet radiation, and are, therefore, likely to be similarly effective, it is intended that these substances be included within the scope of the present invention as well.

The foregoing examples demonstrate the utility of dyes such as Alizarin, Alizarin yellow R, Alizarin red s, Benzopurpurin 4B, 4,4'-bis(4-amino-1-naphthyl-azo)-2,2'-stilbene-disulfonic acid, Brasiline, Bromocresol green, Bromocresol purple, Bromophenol blue, Bromophenol red, Bromothymol blue, Bromoxylenol blue, Carminic acid, Chlorophenol red, Congo red, m-Cresol purple, Cresol red, Curcumin, 3-(4-Dimethylamino-1-naphthyl-azo)-4-methoxybenzene-sulfonic acid, Direct red, Eriochrome black T, Erythrosin B, 4-(4-Ethoxyphenylazo)-3-phenylene-diamine hydrochloride, Ethyl orange, Ethyl red, Ethyl violet, Rematoxylin, Lacmoid, Litmus, Metanil yellow, Methyl green, Methyl red, Naphtholphthalein, Neutral red, Nile blue A, Orange I, 4-(Phenylazo)diphenylamine, Phenol red, Propyl red, Resazurin, Thiazole yellow G, Thymol blue, Tropaeoline 00, and p-Xylenol blue. It is envisioned that other dyes will prove to be equally effective. Such other dyes include, for example those listed in Kodak Laboratory Chemicals, catalogue No. 52 (July 1, 1985) pages 615–620 or other similar sources. Accordingly, it is intended that these other dyes be included within the scope of the invention.

Additionally, it is intended that other media than polyvinyl alcohol having similar hydrophilic characteristics will prove to be effective in the formulation of films, fibers, inks, paints, and the like; provided they are coated with a material barrier which is relatively impermeable to molecular oxygen, impregnated with the antioxidants, or a combination or these two. It is intended that other media be included in the scope of the invention.

In addition, although bisulfite is described as the compound used to increase the solubility of the photoacid progenitor, other compounds, such as bisulfite derivatives, surfactants or other compounds capable of increasing solubility, are to be inclined within the scope of the invention.

It is anticipated that buffering agents other than Tris-HCl, deoxycholate, or phosphates will prove to be equally effective in functioning as buffers. Such other buffering agents include any with a pK greater than the particular dye employed, such as, amines, piperidine, purine, proline, and the like. Therefore, it is intended that these are included in the scope of the present invention.

It is anticipated that pH adjusters other than sodium hydroxide, will prove to be equally effective in functioning as pH adjusters such as any strong base including potassium hydroxide, calcium hydroxide and the like. Similarly, it is anticipated that anti-oxidants other than hexamethylenetetramine will prove to be equally effective. Therefore, it is intended that these are included in the scope of the present invention.

It will be understood that a variety of techniques may alternatively be applied to provide various materials with the above properties which can be cast into films, extruded into fibers, molded into shapes, formulated as inks, paints, and the like. In addition, it will be understood that various modifications in format can be employed to measure the amount of incident ultraviolet light over a specified period of time.

It is contemplated that other formats and physical arrangements and juxtapositions of the materials will be manufactured by those skilled in the art and employed according to the present invention. These alternate formats, arrangements, and juxtapositions are also intended to come within the scope of the invention as claimed.

Numerous modifications and variations in the invention as described in the above illustrative examples are expected to occur to those skilled in the art and consequently only such limitations as appear in the appended claims should be placed thereon.

Accordingly, it is intended in the appended claims to cover all such equivalent variations which come within the scope of the invention as claimed.

What is claimed is:

1. An ultraviolet dosimeter that indicates cumulative exposure to ultraviolet radiation that comprises:

a) a film that is substantially impermeable to oxygen and changes from one color to a different color in response to exposure to ultraviolet radiation that comprises a mixture of:
   i) from about 50 to about 99 weight percent polyvinyl alcohol;
   ii) from about 0.5 to about 50 weight percent water;
   iii) from about 0.01 to 5 weight percent of at least one acid-sensitive dye that is substantially insensitive to changes in temperature;
   iv) from about 0.05 to about 5 weight percent of a surfactant; and
   v) from about 1 to about 40 weight percent of a photoacid progenitor comprising a bisulfite adduct of an ortho nitro-substituted aromatic aldehyde that is converted into a photoacid on exposure to ultraviolet light;

b) an ultraviolet radiation transparent moisture barrier adhered to and surrounding said film;

c) a color standard chart that is affixed to said dosimeter and is in close visual proximity to said film; and d) means to affix the dosimeter to user.

* * * * *